United States Patent [19]

Logan, Jr.

[11] Patent Number: 4,821,635

[45] Date of Patent: Apr. 18, 1989

[54] MEAT SLICING APPARATUS

[76] Inventor: James P. Logan, Jr., Rte. 4, Box 94D, Richmond, Tex. 77469

[21] Appl. No.: 107,256

[22] Filed: Oct. 9, 1987

Related U.S. Application Data

[63] Continuation-in-part of Ser. No. 912,533, Sep. 29, 1986, abandoned, which is a continuation-in-part of Ser. No. 784,658, Oct. 5, 1985, abandoned.

[51] Int. Cl.[4] .......................... A23N 7/00; A47J 17/00

[52] U.S. Cl. .......................................... 99/538; 99/593

[58] Field of Search ................. 99/537, 538, 541, 593, 99/594, 491, 492, 595-599

[56] References Cited

U.S. PATENT DOCUMENTS

| | | | |
|---|---|---|---|
| 2,599,328 | 6/1952 | Hoenselaar | 99/537 X |
| 3,951,054 | 4/1976 | Frentzel | 99/538 |
| 4,287,820 | 9/1981 | Urban | 99/538 |
| 4,332,190 | 6/1982 | Mart | 99/538 |
| 4,412,483 | 11/1983 | Hoegh | 99/538 |
| 4,441,411 | 4/1984 | Mullins, Jr. | 99/538 |

*Primary Examiner*—Timothy F. Simone

*Attorney, Agent, or Firm*—Pravel, Gambrell, Hewitt, Kimball and Krieger

[57] ABSTRACT

An apparatus for slicing meats compromising an electrically driven meat chuck assembly for rotating the meat about a vertical axis, a circular slicer blade for cutting the meat, vertical indexing means for gradually moving the blade vertically, positioning means for moving the blade into slicing engagement and disengagement from the meat, a meat support means for slicing boneless meats, and a positioning stop to limit blade movement during boneless slicing operations. The indexing means include an electrically driven threaded drive shaft providing movement of the blade, and whereby upon disengagement of the blade from the meat, the relative respective positions there between are maintained. The positioning is pneumatically driven, whereby the force bringing the blade into engagement with the meat may be readily overcome manually so as to facilitate prevention of the blade cutting into bones or joints at the eccentrically oriented with respect to the axis of rotation of the meat.

8 Claims, 3 Drawing Sheets

MEAT SLICING APPARATUS

CROSS REFERENCE TO RELATED APPLICATIONS

This application is a continuation-in-part of U.S. application, Ser. No. 912,533, filed Sept. 29, 1986, now abandond. which is a continuation-in-part of U.S. application, Ser. No. 784,658, filed Oct. 5, 1985, now abandoned.

BACKGROUND OF THE INVENTION

1. Field of the Invention

The present invention relates to an apparatus for the slicing of meat and, more particularly, to an apparatus for effecting a spiral slice cut in a ham, beef roast, or the like.

2. General Background

There exists a number of different apparatus for spiral slicing of meats, such as hams or roasts, about the bone located in the cut of meat. These devices have a number of common features. First, they typically include a rotating chuck assembly. The chuck assembly is driven by some motorized means and is designed to hold the meat to be cut, thereby rotating the meat about the chuck assembly rotational axis. Second, the device includes a rotating circular saw blade, disposed in a plane generally perpendicular to the rotational axis of the chuck assembly and including a means for driving the saw blade, for cutting the meat. To facilitate the mechanics of the cutting process, provisions are generally made for adjusting the position of the saw blade relative to the stated plane. Third, the device includes a means of gradually linearly indexing the saw blade assembly relative to the meat. The index axis is typically parallel to the chuck assembly rotational axis. Lastly, the saw blade assembly typically includes a means for rotating the saw blade about the index axis, thereby laterally positioning the saw blade and bringing the blade into cutting engagement with the meat. The rotation of the meat, when in contact with the saw blade, and the linear indexing of the blade relative to the meat, effect a generally continuous spiral cut of the meat about the bone. While the concept of the apparatus has been accepted, there persists a number of problems associated with existing devices, which will be described hereinafter.

One such device was set forth in U.S. Pat. No. 4,441,411, issued to Mullins. In this device, the saw blade assembly was vertically indexed relative to the meat by linking the saw blade assembly to a first hydraulic vertical drive cylinder. However, there were a number of problems with this type of hydraulic vertical indexing system.

First, prolonged use of the device increased the temperature of the hydraulic fluid and thereby caused a change in fluid viscosity. This change in fluid viscosity resulted in an undesired variation in the vertical indexing rate, which varied the cut from the desired thickness of the meat slices. Further, it is normal for conventional hydraulic systems to operate in the pressure range of 1000–2000 psi, where the Mullins device operated in the range of 50–60 psi. Prolonged use of the device resulted in wear in the seals and other elements of the hydraulic circuit, which combined with operating out of normal hydraulic circuit pressure range and other operational aspects described in greater detail below, caused variations up to ±10 psi. during the course of operation.

These pressure variations also resulted in a non-uniform meat slice thickness.

Second, consistency in vertical positioning is important in a meat slicing operation. In the interest of safety, the slicing of meat is a man-attended operation. Commercial operations often call for the operator to be called away from the slicing operation for other tasks. Safety procedures call for the blade to be disengaged from the meat and the apparatus de-energized when the operator is away. Due to variations in fluid temperature and wear in hydraulic system components, the Mullins device often experienced a "bleed down" or leakage within the hydraulic system. The bleed down resulted in a variation in the height of the saw blade from the height at the time of interruption of operations. It was difficult for the operator to vertically re-index the saw blade to the position where disengagement occurred when resuming operations, which yielded a non-uniform cut.

A hydraulic cylinder linkage was also used in U.S. Pat. No. 4,441,411 to laterally position the saw blade into engagement with the meat. Herein, a second, horizontally disposed, hydraulic cylinder, operating in the same hydraulic system, was linked to the shaft linkage of the vertical indexing cylinder through an offset arm. Actuation of the second hydraulic cylinder caused the shaft linkage of the vertical indexing cylinder to rotate about the vertical indexing axis and laterally positioned the saw blade relative to the meat to be cut.

The problem with this arrangement is a peculiarity of the type of meat to be cut. The cuts of meat typically have a first bone, which is generally aligned with the rotational axis of the chuck assembly. Many of the cuts, such as picnic hams and the like, also have a second or "aitch" bone, which are offset and eccentrically positioned relative to the first bone. In order to properly effect a spiral cut, it is necessary for the saw blade to cut circumferentially about the first bone. However, the saw blade will come into contact with the eccentrically positioned aitch bone during the rotation of the meat, causing a destructive wearing of the saw blade and possible chipping of the aitch bone, thereby ruining the cut of meat.

This problem is generally addressed through the inclusion of an override handle attached to the saw blade assembly to permit the operator to withdraw the saw blade a sufficient distance to "ride" about the aitch bone. Because the aitch bone is not visible during the cutting operation, this technique requires the operator to acquire a "feel" for when the blade is in contact with the aitch bone, so as to manually override the engagement force of the second hydraulic cylinder. By feeling the resistance met by the saw blade, the operator is able to keep the saw blade in light contact with the bones in the meat as it rotates about the chuck assembly axis.

The problems with the hydraulic positioning system of U.S. Pat. No. 4,441,411 arose from the relative incompressibility of hydraulic fluid. First, it was difficult for the operator to determine when the saw blade is coming in contact with either the first or second bone. Where the operator was unable to feel the contact through the override handle, meat spoilage and blade breakdown could occur. Second, the amount of force required to overcome the engagement force supplied by the second hydraulic cylinder was excessive due to the relative incompressibility of the hydraulic fluid. A biasing spring within the second hydraulic was provided for in this device to help overcome fluid incompressibility;

however, it too operated against fluid pressure. Third, by being coupled to the same hydraulic circuit as the vertical indexing cylinder, overriding the lateral positioning force varied the hydraulic system pressure, causing a variation in vertical index rate and a non-uniform slice thickness. During the course of daily operations, an establishment utilizing this type of apparatus may cut an average of 10–15 hams per day, with peak days having as many as 60. Over an average day's operation, an operator may have been required to exert from 68 to 71 pounds of force over a distance of 4–6 inches to withdraw the blade a sufficient distance over the aitch bone. Further, the operator performed this manual override an average of 12–15 times per ham. Thus, during the course of an average day, the operator expended over 5000 ft-lbs during slicing operations. On peak days, this expenditure was as high as 25,200 ft-lbs. It will be appreciated that the amount of override work expended over a day's operation was highly fatiguing to the operator and could result in spoilage of meat due to miscuts.

Other embodiments of this type of apparatus varied the means by which each of the basic functions were carried out. U.S. Pat. No. 4,287,820 disclosed a clutch actuated, chain driven, carriage for vertically indexing the saw blade assembly. U.S. Pat. No. 4,332,190 utilized a gear-driven, threaded shaft to vertically index the saw blade assembly. One disadvantage common to both of the above devices was that the rate of vertical indexing was dependent upon the rotation rate of the chuck assembly. In U.S. Pat. No. 4,287,820, the relationship was determined by the gear which drove the vertical indexing carriage. In U.S. Pat. No. 4,332,190, the relationship was determined by a gear ratio and lead screw. Both of these devices could vary this relationship only upon changing either a lead screw or gear. This presented a significant disadvantage in commercial operations where slice thickness varied with customer demand.

A similar problem exists in U.S. Pat. No. 2,599,328 wherein the cutting rate was controlled by the rate of rotation. In this apparatus, the meat was rotated and simultaneously vertically indexed. Instead of using a circular saw blade, a reciprocating saw was used to cut the meat. The reciprocating saw was gear driven from the same motor which controlled the vertical indexing and rotation. The problem with this device was that the vertical indexing, meat rotation and saw speed were all interrelated. Slice thickness was varied by changing the vertical index lead screw; a time consuming operation.

Accordingly, a meat slicing apparatus is desired which does not suffer from the disadvantages of hydraulic systems and which provides a higher degree of selection of cutting thickness than that provided by strictly mechanical systems. The present invention is designed to overcome the above problems and also provides a method for spiral cutting boneless meats.

SUMMARY OF INVENTION

Briefly, the present invention provides a new and improved meat slicing apparatus, capable of effecting a spiral cut in hams or other meats, including boneless meats. The apparatus includes an electrically driven, rotating meat chuck assembly for holding the meat and rotating the meat about the rotational axis of the chuck assembly during cutting operations; a circular slicer blade generally disposed in a plane perpendicular to the chuck rotational axis for cutting the meat; an electrically driven, linear indexing system for moving the slicer blade along an axis parallel to the chuck rotational axis; a pneumatic positioning system for moving the slicer blade into cutting engagement with the meat; and a meat spit adapted to fit within the chuck assembly and provide structural support for boneless meats during cutting operations. The apparatus is also provided with a rotational stop which will limit blade engagement during boneless meat cutting operations.

The chuck assembly is designed to hold and rotate the meat during cutting operations. The chuck assembly is also designed to receive a meat spit, which is inserted into the assembly along the chuck assembly rotational axis. The meat spit is inserted into boneless cuts of meat and is designed to provide structural support for the meat during boneless cutting operations. The ability to spirally slice boneless meats does not appear in the prior art and represents a new commercial application for spiral slicing apparatus.

The linear indexing means include an electrically driven, threaded drive shaft, disposed along a linear index axis, parallel to the chuck rotational axis. The drive shaft rotates at a precisely controlled variable rate and direction in response to rotation of an electrical motor, wherein the motor direction and rate are controlled by an electrical motor controller. The rotation of the drive shaft is translated into motion along a linear index axis which in turn moves a blade rotator sleeve along the linear index axis. A slicer blade assembly is mounted on the first end of the blade rotator sleeve, the slicer assembly including a motor, blade support arm and a slicer blade which is pendently disposed on the first end of the blade, support arm in a plane generally perpendicular to both the chuck rotational axis and the linear index axis. The nature of the electrically driven threaded drive shaft is such that when the electrical motor is deactivated, the drive shaft and, therefore, the slicer assembly maintains linear position with respect to the meat. Thus, the slicer blade may be disengaged from the meat, power deactivated, and power later reactivated and the blade readily re-engaged at the same vertical position relative to the meat, thereby permitting a continuation of the spiral cut.

The blade positioning system is a pneumatically driven rotating system linked to the blade rotator sleeve, wherein activation of the pneumatic system causes the blade rotator sleeve to rotate about the linear index axis, so as to cause the slicer blade engage or disengage the meat. One embodiment of the pneumatic rotating system contemplates a dual pneumatic cylinder disposed in a plane perpendicular to the linear index axis. The pneumatic cylinder includes a cylinder rod which is linked to a sliding offset arm on the blade rotator sleeve, whereupon energizing a selected side of the pneumatic cylinder the sleeve will rotate in a clockwise or counterclockwise direction, thus engaging or disengaging the slicer blade in the meat. During boneless cutting operations, a split nut stop is threaded onto an externally threaded nut mounted on the face of the pneumatic cylinder. The stop limits rotation of the blade's rotator sleeve during boneless meat slicing operations, thereby limiting movement of the slicing blade to within ⅛ of an inch of the meat spit inserted into the meat as described above. The pneumatic positioning means, as a result of utilizing a relatively compressible fluid, permits the engagement force to be readily overcome, thereby preventing the blade from cutting into bones or joints in the meat which are located eccentric with respect to the chuck axis of rotation. The manual force required to overcome pneumatic force engagement during slicing operations is in the range of 22–25 pounds. During commercial slicing operations, as described above, the operator expends 1,500 ft-lbs on an average day and 9,000 ft-lbs on a peak day as opposed to hydraulic system expenditures of 5,040 ft-lbs and 25,200 ft-lbs, respectively. This represents a significant labor saving during slicing operations.

DETAILED DESCRIPTION OF THE INVENTION

Figure 1:
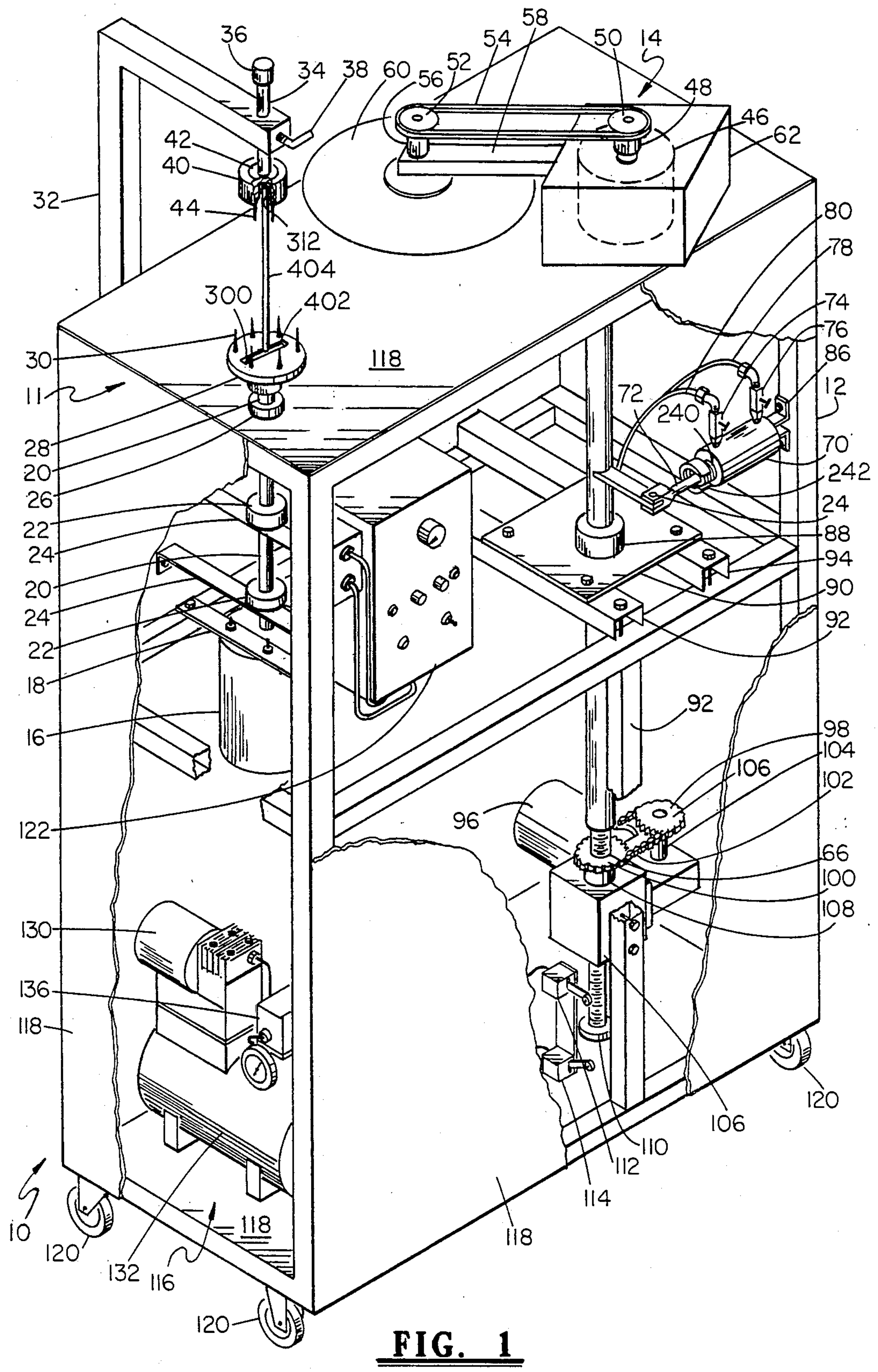
FIG. 1 is a pictorial illustration, partially in section, depicting the present invention.

Referring now to FIG. 1, there is depicted therein a meat slicing apparatus 10, which includes a meat chuck assembly 11, a pneumatic positioner assembly 13, a slicer assembly 14, linear indexing assembly 15 and a main frame 12 used to support the chuck and slicer assemblies 11 and 14 and other components of the apparatus.

Referring now to the main frame 12, shown in FIG. 1, the frame 12 is composed of a plurality of support beams 92 which form a base for the slicer assembly 10. The frame 12 includes a plurality of support beams which traverse the inner space defined by the frame 12, so as to provide support for various components described hereinafter. The frame further includes cover plates 118, which form a floor, top plate and side plates to the frame. Mounted internal of main frame 12 is an electrical control module, which provides a housing for a plurality of electrical components described hereinafter.

Referring now to the chuck assembly 11, shown in FIG. 1, having upper and lower assemblies. The upper chuck assembly includes a generally L-shaped support arm 32, which is connected to main frame 12. A chuck support shaft 34, having a stop 36 on its upper end, and a blind hole 312 therein on its lower end, extends through the support arm 32. A threaded chuck lock 38 extends through and is in threaded engagement with the end of chuck support arm 32 and may be rotated to be brought into contact with chuck support shaft 34 to prevent movement of chuck support shaft during operations. A bearing 42 is mounted on the other end of the support shaft and carries an upper chuck 40, having a plurality of spikes mounted perpendicular to the face of the chuck 40, to permit rotation of chuck 40. The upper chuck 40 includes a blind hole 312 extending through upper chuck 40 to receive the stem member 404 of meat spit 400.

The lower chuck assembly includes an electrical motor 16, which is mounted on frame 12 and support beams 92 within frame 12 by means of a motor mount 18. The chuck motor 16 includes a drive shaft 20 which extends through an upper plate 118 of the slicing apparatus 10. A bearing 26 is provided for on the upper plate 118 to reduce friction as the shaft 20 rotates. The motor shaft 20 is interconnected with the lower chuck 28, having a plurality of spikes aligned perpendicular to the face of lower chuck 28, and is in coaxial alignment with chucks 28 and 40, and chuck support shaft 34, thereby defining a chuck rotational axis. The lower chuck 28, having a slot 300 therein, is designed to receive tee member 402 of meat spit 400 in slot 300. The meat spit 400 is used in the slicing of boneless meats to provide support by inserting stem member 404 into the meat during slicing operations. Upon activation of motor 16, the lower chuck 28 is caused to rotate by drive shaft 20, thereby rotating any meat disposed between chucks 28 and 40 about the chuck rotational axis.

Referring now to the slicer assembly 14 in FIG. 1, a circular slicer blade 60, having a blade shaft 56 and a blade pulley 52, is disposed in a plane generally perpendicular to the chuck rotational axis. The blade shaft 56 is interconnected to a blade support arm 58, which is in turn connected to a slicer motor housing 62, in a manner to permit the blade shaft to rotate, thereby permitting the circular slicer blade 60 to also rotate. An electrical motor 46, having a motor drive shaft 48 and motor pulley 50, is mounted within the slicer motor housing 62 with the drive shaft 48 essentially parallel with the chuck rotational axis. A belt 54 is routed between the blade pulley 52 and motor pulley 50, such that activation of motor 46 will rotate motor pulley 50 and transmit the rotation to blade pulley 52, thereby causing circular slicer blade 60 to rotate.

Still referring to FIG. 1, the linear indexing assembly 15 is used to move the slicer blade assembly 14 parallel to the axis of the rotation of the chuck assembly 11. An electrical indexing motor 96 is mounted on the main frame 12 of the slicing apparatus 10. A motor drive shaft 104 and sprocket member 98 are connected to the indexing motor 96 and aligned parallel to the chuck assembly 11 axis of rotation. A threaded indexing shaft 66 extends through a sprocket support bearing 108, also along an axis parallel to chuck assembly 11 axis of rotation. The sprocket support bearing 108 is mounted on a sprocket support housing 106, which is in turn mounted on main frame 12. The sprocket support bearing 108 is also threaded through a second drive sprocket 100. Drive sprockets 100 and 98 are interconnected by a drive chain 102. A limit switch trip plate 110 is mounted on the lower end of the threaded shaft 66. Energization of motor 96 will cause motor drive shaft 104 and sprocket 98 to rotate, imparting rotation to sprocket 100 by means of drive chain 102. The rotation of sprocket 100 in turn rotates sprocket support bearing 108, the rotation thereby causing threaded shaft 66 to move in a linear direction dependent upon the direction of motor rotation, parallel to the chuck assembly 11 rotation axis. An upper limit switch 112 and a lower limit switch 114 are disposed about switch trip plate 110 in a position corresponding to the corresponding desired upper and lower indexing positions. Switch plate 110 coming in contact with either limit switch 112 or 114 will result in the de-energization of index drive motor 96, thereby preventing any further linear motion.

Figure 3:
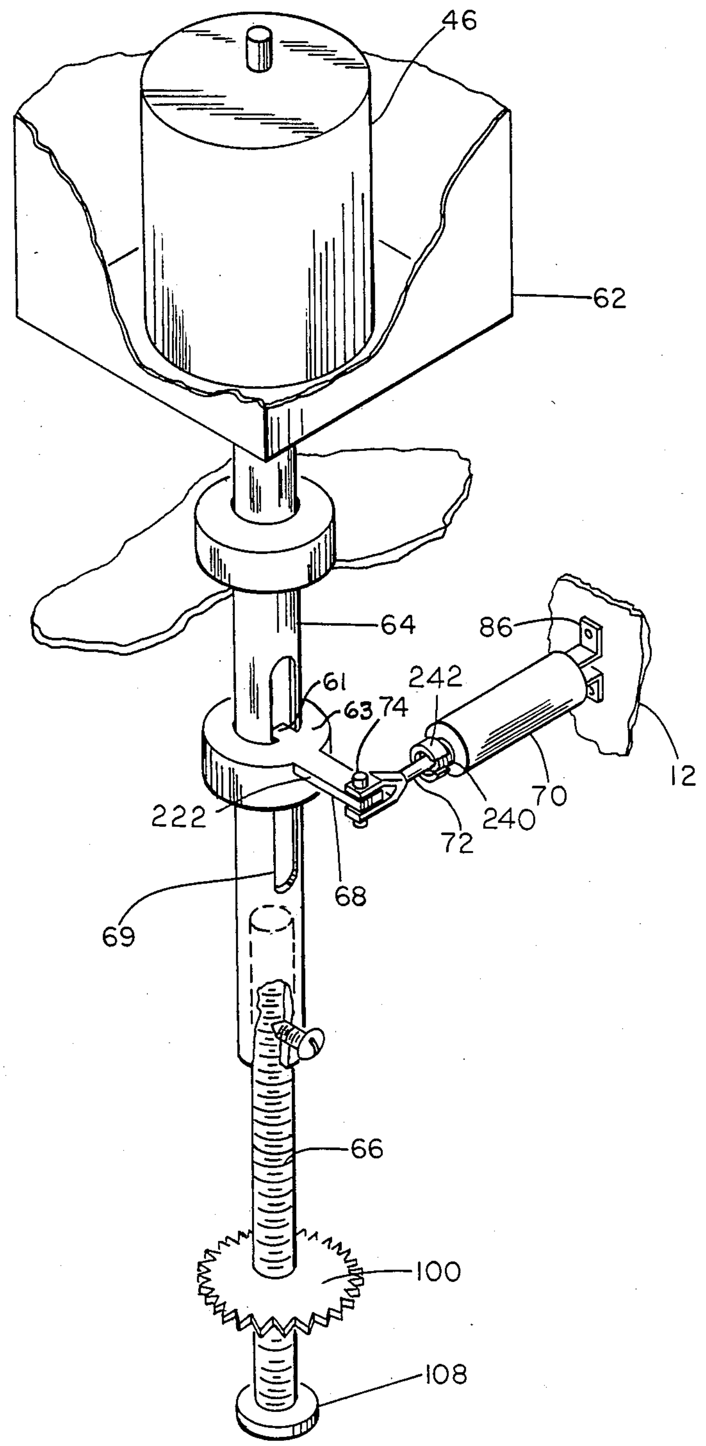
FIG. 3 is an illustration of the interaction between the threaded drive shaft, rotator sleeve and pneumatic cylinder of the present invention.

Still referring to linear indexing assembly 15, shown in FIG. 1, a bearing support plate 90 is mounted within main frame 12, in a plane perpendicular to the motion of threaded shaft 66, by means of a plurality of support beams 92. The bearing support plate 90 in turn carries a pillow block bearing 88, through which is extended a blade rotator sleeve 64, having a slot 69 therein, as shown in FIG. 3. One end of the blade rotator sleeve 64 is interconnected to slicer blade assembly 11 by connecting blade rotator sleeve 64 to slicer motor housing 62 in a suitable fashion. The other end of rotator sleeve 64 is interconnected to threaded drive shaft 66. The linear motion of threaded shaft 66 is transmitted through blade rotator sleeve 64, thereby causing the slicer blade assembly 14 to move along an axis parallel to chuck assembly 11, in a direction dependent on the direction of rotation of drive motor 96.

A pneumatic positioner assembly 13 is also shown in FIG. 1. A dual chamber pneumatic cylinder 70, having a cylinder rod 72, is mounted on main frame 12 by means of a bracket 86, in a plane perpendicular to the linear movement of threaded shaft 66. The cylinder rod 72 is connected by a pin 74 to a blade rotator arm 220. The blade rotator arm 220 includes a body 63, an offset arm 222 and a tongue 61, and fits over the blade rotator sleeve 64, as more clearly shown in FIG. 3. A pair of pneumatic supply hoses 78 and 80 are connected to pneumatic cylinder 70 through a pair of valves 76 and 74, respectively. Mounted on floor 118 of main frame 12, is an air compressor assembly 116, consisting of a compressor motor 130, an air reservoir 132, and an air compressor switch 136. The supply hoses 78 and 80 are connected to air reservoir 132 by means of a two position air valve 232 and air pressure regulator 230, as more clearly shown in FIG. 2. The energization of pneumatic cylinder 70, through supply line 78 and air valve 76 causes cylinder rod 72 to move in an outward direction, thereby imparting a clockwise rotation, about the axis of linear motion, to the rotator arm 220, which in turn transmits the rotational motion to blade rotator sleeve 64 and slicer blade assembly 14, which will move the slicer blade 60 away from any meat disposed in the chuck assembly 11. Conversely, energization of pneumatic cylinder 70 through supply line 80 and air valve 74 will cause the cylinder rod 72 to retract into the pneumatic cylinder 70, thereby imparting a counterclockwise rotation, about the axis of linear motion, to the rotator arm 220, which in turn transmits the rotational motion to the blade rotator sleeve 64 and slicer blade assembly 14 which will move the slicer blade 60 toward any meat disposed in the chuck assembly 11.

The pneumatic cylinder 70 is provided with an externally threaded nut 240, which is affixed to the face of cylinder 70 and coaxially aligned with cylinder rod 72. The threaded nut 240 may be attached to the face of the pneumatic cylinder 70 by spot welding or other means. A split nut 242 is also provided as shown in FIG. 3, which permits the split nut to be positioned around cylinder rod 72 and threadedly engage the threaded nut 240. The split nut stop 242, therefore, limits movement of the offset arm 222, which in turn, limits the rotational movement of the slicer assembly 14. The split nut 242 is mounted on pneumatic cylinder 70 during boneless slicing operations and is designed to restrict the lateral motion of the slicer assembly 14, such that the slicer blade 60 is restricted to moving within ⅛ of an inch of the meat spit 400.

Figure 2:
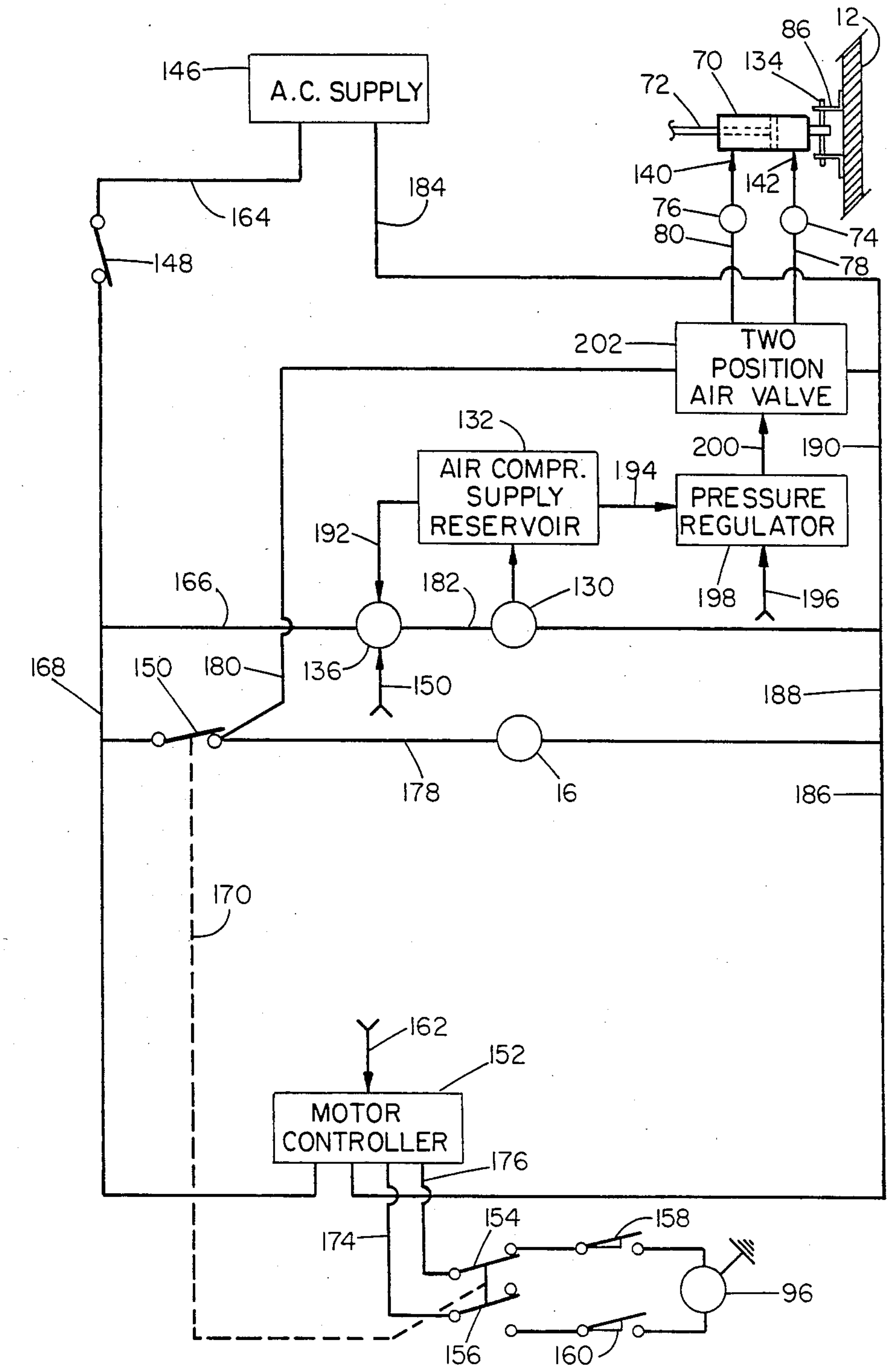
FIG. 2 is a schematic of the electrical and pneumatic systems of the present invention.

The above description has made reference to a number of electrical and pneumatic components required in the operation of the slicer assembly 10. FIG. 2 is a schematic which describes the electrical and pneumatic components in greater detail and the manner in which they are interconnected.

A convenient source of A/C Supply 146 may be delivered to two electrical supply lines 164 and 184 which are interconnected to the various components of the slicing apparatus 10 in a manner to be hereinafter described. More particularly, the one side 164 of the A/C Supply 146 may be preferably routed through a main on/off switch 148 and may continue as line 168 to an appropriate solid state motor controller 152. The other side of the A/C supply 146, designated as reference numeral 184 will be delivered to the remaining side of the motor controller. The general purpose of the motor controller 152 is to control the rpm of the motor 96 in a precise fashion as desired. It will be appreciated that the rotational speed of the motor 96 will, in turn, through the sprocket assembly previously described, directly effect the rotational speed of the threaded drive shaft 66 and, ultimately the rate at which the blade 60 is made to traverse linearly, as will be hereinafter described with reference to FIG. 3. Accordingly, it is a feature of the invention to provide for such precisely controlled vertical movement of the drive shaft 66 by means of such electrical drive provided by the motor 96 and electrical motor speed control provided by motor controller 152. In response to a setting shown schematically as speed control 162 to the motor controller 152, electrical energy will be provided as represented by outputs 174 and 176 from the motor controller 152 to the motor 96. Thus, by adjusting the speed control 162, these outputs 174 and 176 will, in turn, be adjusted as desired, whereby the speed of the motor 96 will, in like manner, be adjusted.

With further reference to the wiring schematic shown in FIG. 2, double pole switches 154 and 156 will be provided whereby in response to the positioning of the switches, electrical energy represented by line 176 may be delivered to motor 96, or in the alternative, by positioning switches 154 and 156 downwards relative to their configuration as depicted in FIG. 2, electrical supply 174 may thereby be connected to motor 96 while the supply line 176 is disconnected therefrom. In one embodiment, the motor 96 may be a bi-directional D/C synchronous with electrical energy supplied by lines 174 and 176 being of opposite polarity. Accordingly, the function of the switches 154 and 156 may now be recognized as directional switches which control the direction of rotation of motor 96 and accordingly, direction of rotation of the threaded drive shaft 66 as desired, dependent upon the respective relative positioning of the switches 154 and 156. Therefore, switches 154 and 156 may be utilized to control the movement of the slicer assembly 14 and slicer blade 60 in either the upward or the downward direction as desired. Moreover, limit switches 158 and 160 will be provided in series with switches 112 and 114 and their corresponding supply lines 176 and 174, the limit switches corresponding to the limit switches 112 and 114 depicted in FIG. 1. Such switches will preferably be normally closed, and will open up the circuit supply and energy from the motor controller 152 to motor 96 upon contact of the plate 110 in a manner herein before described.

As indicated in FIG. 2, switches 154 and 156 are ganged to switch 150 whereby when switch 150 is in the closed position as shown in FIG. 2, switch 154 is also closed nd switch 156 is open. Conversely, when switch 150 is open, switch 154 is open and switch 156 is closed. It will be noted that switch 150 is wired in series with chuck motor 16 through line 178 and is also wired in series to a two-position air valve 232 through line 180. The air valve 232 will cause pressurization of the cylinder housing 70 in response to the energization or deenergization of line 180 so as to cause the cylinder 72 to stroke in the left or right direction as desired.

It will be appreciated that switches 150, 154 and 156 are shown in a typical position wherein the slicing operation is occurring. The closure of switch 150 causes the air valve 232 to be activated so as to cause inward stroking of cylinder rod 72 and to bring slicer blade 60 into slicing engagement with the meat disposed between chucks 28 and 40. Moreover, due to closure of switch 150, chuck motor 16 is activated through line 178 to cause the desired rotation of the meat within the chuck during slicing operation. Still further, due to ganging of switch 150 to switches 154 and 156, as shown schematically by line 170, motor 96 will be engaged by energization through line 176 and switch 154 and the normally closed switch 158 so as to cause the motor 96 to rotate in the appropriate direction to, in turn, cause the gradual linear indexing of slicer blade 60 in an upward direction. This indexing will cease when the upper limit switch 112 is triggered by plate 110.

When it is desired to stop the slicing operation, switch 150 or switch 148 is opened. This de-energizes chuck motor 16 so as to stop rotation of the meat. Moreover, this causes de-energization of control line 180 to air valve 232, so as to cause cylinder housing 70 to be pressurized so as to reverse the direction of the stroke of the cylinder rod 72 in a direction opposite to that previously described, whereby slicer blade 60 is disengaged from the meat being sliced. Still further, due to the ganging between switches 154 and 156, upon closing switch 150, switch 154 opens and switch 156 closes. In this manner, the motor 96 is now energized by line 174 from motor controller 152 through switch 156 and normally closed limit switch 160. In one embodiment, the direction of rotation of motor 96 is a function of energizing polarity and that energizing lines 174 and 176 are of such opposite polarity whereby upon energization of motor 96 through line 174, the rotation of motor 96 reverses. This in turn will cause the slicer assembly 14 to index downwards until the switch trip plate 110, as shown in FIG. 1, contacts lower limit switch 114, opening the circuit and thus de-energizing motor 96. In this manner, slicer blade 60 is repositioned in a lower starting position ready to begin operation of slicing the next piece of meat disposed between chucks 28 and 40.

It will be recalled that motor 96 causes the upper and lower movement of the rotator sleeve 64 and thus slicer assembly 14 attached thereto, as shown in FIG. 1, in a gradual indexing fashion so as to provide uniform spiral slicing of the meat. It will further appreciated that if motor 96 is totally de-energized, slicer assembly 14 may be accordingly be made to remain in the vertical position it was immediately prior to de-energization of motor 96.

Still referring to FIG. 2, it will be further noted that the slicing apparatus 10 is provided with a compressor motor 130 which made be wired in series with an appropriate pressure switch 136 so that yet another series circuit is completed to line 166, switch 136, line 182, motor 130, and line 184. The compressor motor 130 will run upon electrical energization from the A/C supply 146 so as to generate pressurized air as shown by the arrow running from motor 130 to air compressor supply reservoir 132. Thus, during operation of motor 130, reservoir 132 contains air pressurized from the compressor motor 130. The pressure switch 136 monitors the internal air pressure of reservoir of 132 as shown by feedback arrow 192. Moreover, the pressure switch 136 may be adjusted schematically by the pressure adjustment 150, whereby, power is supplied through pressure switch 136 to motor 130 to build up the pressure in reservoir 132. However, when pressure switch 136 detects pressure within reservoir is at the desired level set by pressure adjustment 150 from feedback line 192, pressure switch 136 will open shutting off compressor motor 130.

A source of pressurized air is delivered by supply line 194 from reservoir 132 to an appropriate pressure regulator 198 and this pressurized air thence flows through regulator 198 to supply line 230 to aforementioned to positioned air valve 232. The pressure regulator 198 in like manner to pressure switch 136, may include a pressure adjustment as indicated by adjustment 196 whereby the pressure supplied by line 194 maybe regulated downwards to any desired amount before introduced into supply line 230 into air valve 232. The purpose of pressure switch 126 is to regulate the pressure within supply reservoir 132 so as to prevent it to reaching an undesired maximum which is not needed for proper operation of air valve 232 and cylinder rod 72. Pressure regulator 198 is for purposes of regulating the magnitude of pressure necessary for proper operation cylinder rod 72 so as to ensure the full necessary stroke in both directions of cylinder rod 72 and thereby ensure proper engagement and disengagement of slicer blade 60 with the meat.

An air pressure supply line 80 is routed through valve 76 and delivered as line 140 to cylinder housing 70. In like manner, an air supply line 78 from air valve 232 is routed through valve 74 and delivered as supply line 142 to cylinder housing 70. As schematically depicted by the phantom lines within housing 70, a piston is disposed within cylinder housing 70 and interconnected to the cylinder rod 72 such that energization of housing 70 by supply line 140 causes the movement of piston and cylinder rod 72 to the right, in turn causing the counter clockwise rotation of slicer blade 60 about the vertical index axis. Conversely, upon energization of supply to 142, the piston and cylinder rod 72 is caused to move to the left, which in turn, causes clockwise rotation of slicer blade 60 about the linear index axis and thereby disengaging blade 60 from the meat. The cylinder housing 70 may be interconnected to the main frame by any convenient means such as cylinder support bracket and interconnected pin, as shown in FIG. 3.

It will be recalled that to position air switch valve 232 is a valve which transmits air pressure delivered by supply line 230 into a preselected one of the air pressure supply lines 78 and 80 in response to the electrical control signal on line 180 while venting the remaining line to the atmosphere. Air pressure valve 232 will cause pressure to be delivered into one supply line 78 when control line 180 is activated and causes pressure to be delivered by air valve 232 on supply line 80 when the control line 180 is deactivated. In this manner, when switch 150 is positioned as shown in FIG. 2 wherein the slicing apparatus 10 is in slicing operation, piston within cylinder housing 70 is energized by air pressure so as to cause outward stroking of cylinder rod 72 thereby bringing slicer blade 60 into engagement with the meat. However, when switch 150 is in the opened position, the piston strokes in the opposite direction causing withdrawal of slicer blade 60 from the meat. Regulator valves 74 and 76 are provided for precise regulation of the amount of air pressure necessary in lines 140 and 142 to cause the desired amount of stroking of rods 72 and achieve the desired movement of slicer blade 60.

Referring back to FIG. 1, it will be appreciated that at times, it is desirable to manually override the force which brings slicer blade 60 into engagement within the meat held between chucks 28 and 40 as, for example, when the eccentrically-oriented aitch bone within the meat traverses about the chuck rotational axis. When the meat has rotated to the location where the eccentrically-oriented bone will come in contact with slicer blade 60, blade support arm 58 may be moved slightly in a clockwise direction so as to override the force introduced by rode 72, causing blade 60 to otherwise move towards the meat. It is a feature of the present invention that the force bringing slicer blade 60 towards the meat is provided by pneumatic pressure within the cylinder housing 70 as opposed to hydraulic pressure of a relatively incompressible fluid.

Accordingly, the force required to overcome the force provided by cylinder rod 72 is greatly reduced as the operator is forcing the piston within housing 70 in a direction toward the high pressure side of the piston, thus compressing the air within the cylinder housing 70. In this manner, operator fatigue is reduced, and enabling the operator to cause the blade 60 to gently ride over the outer circumference of the aitch bone so as to avoid severing of the bone or joint and ruining the meat cut. Moreover, the utilization of pneumatic force in moving slicer blade 60 towards meat, the operator may be more readily capable of sensing or feeling through blade 60 and support arm 58 the relative position of the outer circumference of the bone or joint as it rotates about the chuck assembly rotational axis. This is in contrast to the prior apparatus using a relatively incompressible or liquid hydraulic fluid drive.

It will be appreciated that it is generally desirable for slicer blade 60 to maintain slight engagement or to be substantially close to the outer circumference of the bone so as to provide slicing of the meat all of the way to the bone and that as the meat rotates, the distance between the outer circumference of the bone facing slicer blade 60 and slicer blade 60 would otherwise vary due the eccentricity of the bone if slicer blade 60 were to remain stationery. The movement of slicer blade 60 towards and away from the meat is necessary during slicing operations to compensate for this eccentricity and to maintain slicer blade 60 in light contact with or in close proximity to this outer circumference of the bone. Thus, during normal slicing operations, slicer blade 60 will move outwards away from the meat and inwards toward the meat once per revolution of the meat. In prior hydraulic systems, wherein the operator had to provide such outward movement of slicer blade 60 by force against a hydraulic system, this was quite tiresome. Moreover, due to the relative lack of compressibility of hydraulic fluid, hydraulic systems or circuit leakage was the only means available for providing some movement or give in the movement of slicer blade 60 by manual override which was generally insufficiently slight and cause undo work for the operator over a plurality of slicing operations. However, with the present invention, the force provided by the cylinder housing 70 to bring slicer blade 60 towards the meat may be overcome much more easily inasmuch as air or some other pneumatic fluid is being compressed by the operator by the movement of support arm 58 away from the meat. Moreover, inasmuch as more "give" is afforded by a pneumatic cylinder rather than a hydraulic one, the operator is much more readily able to cause blade 60 to maintain a very light engagement with the outer circumference of the bone or joint of the meat.

The manner in which the slicer assembly 14 is gradually indexed upwards and downwards during the slicing operation to provide the desired spiral slicing will now be described in greater detail with reference to FIG. 3. A more detailed view of the blade rotator sleeve 64 as shown in FIG. 3, reveals that a slot 69 provided therein. Also, in the embodiment shown in FIG. 3, a sleeve offset arm 222 may include a torroidal shape slide member 63 circumscribing the outer surface of the rotator sleeve 64 and having a tongue portion 61 extending into the vertically aligned slot 69. In this manner, the rotator sleeve 64 is permitted to move vertically with the respect to offset arm 222. However, due to tongue 61 of torroid member 63 extending into slot 69, upon actuation of the piston within cylinder housing 70, the stroke of cylinder rod 72 may be transmitted through pin 74 to offset arm 222 so as to cause rotation of the rotator sleeve 64 about the linear indexing axis in the desired direction. Therefore, the linear movement of rod 72 is transmitted through pin 74 to the offset arm 222 and converted into torque delivered by the tongue of 61 of the torroidal member 63 to rotator sleeve 64.

Still referring to FIG. 3, rotator sleeve 64 is also desirably hollow and has an internal thread which receives the outer threads of shaft 66. Alternatively, a set screw may be provided extended through the wall of rotator sleeve 64 which follows the outer thread of shaft 66. In other of these manners, upon rotation of shaft 66 about the linear index axis by means of aforementioned sprocket drive assembly including sprockets 98, 100, and drive chain 102, as shown in FIG. 1, this rotation will be imparted to the rotator sleeve 64 so as to move the sleeve upwards and downwards gradually. Moreover, the sleeve 64 will be preferably interconnected to the motor housing 62 through appropriate bearings such as pillow block bearing 88 and like bearings which may be provided between the upper cover 118 and the lower portions of the motor housing 62. In this manner, as shaft 66 indexes in response to rotation of motor 96, the motor housing 62 and slicer assembly 14 may be raised upwards or downwards in a gradual linear indexing fashion at a rate controlled by the speed of motor 96, which, in turn, may be adjusted by speed control 162 to the motor control 152 as shown in FIG. 2. Thus, it will be appreciated that the relative rotational rate of chuck assembly 11 in relation to the linear movement rate of slicer assembly 60 (which as just described is controlled by the speed control 162) will regulate the thickness of slices of the meat. Moreover, because the vertical movement of rotator sleeve 64 is controlled by direct drive from motor 96 and a mechanical linkage therefrom, the rotator sleeve 64 and ultimately slicer blade 60 will remain indefinitely in the vertical position they were in prior to de-energizing motor 96.

It will be appreciated that the structural members and composition of material of the slicing apparatus 10 admit to numerous different embodiments without departing from the teachings of the present invention, and maybe selected in accordance with conventional well known mechanical design and construction techniques. Thus, for example, for structural integrity, it may be desirable to locate support beams 92 in additional locations depending upon the application. It has been found that structural aluminum appears to work quite well for such structural beams 92 and the overall main frame 12 as well as cover plates 118, although other materials may be employed.

The following details apply to a typical working embodiment which have appeared to work quite well.

| | |
|---|---|
| RPM of Shaft 20 | 10–12 RPM |
| RPM of Blade 60 | 110–130 RPM |
| Upward Angle of Plane of Blade 60 Relative to Horizontal Plane | 0°–2° |
| Upward Rate of Vertical Movement of Blade 60 | .07°–.2 in/sec - (i.e., for ⅛ slices blade 60 transverses a meat cut 11"–14" tall nominally in 2 to 2½ minutes) |
| Motor Controller 152 | Model KBPC-19R Penta KB Power brand from a K & B Electronics, Inc., Brooklyn, NY |
| Two-Position Air Valve 202 | Model MC ¼" NPT Air Valve from MAC, Inc., Chicago, Illinois |

However, it will be appreciated that the invention admits of many modifications of the above components and specifications depending on the particular application so long as they comport with good conventional engineering design and construction principles. For example, it may be desirable for the cutting operations to proceed wherein the blade 60 moves in a generally downward direction, in which case the threads of shaft 66 or the direction of movement of the motor 96 must be reversed, as well as the upward angle of the plane of the blade 60 so that it will slightly slope downwards in a direction toward the meat. The pressure regulator 198 is adjusted by pressure adjustment 196 so as to provide pressure through line 200 to the air valve 202 and pressure in lines 140 and 142 to the cylinder housing 72 nominally on the order of 60 to 70 psi. Still further, the stroke of the cylinder rod 72 is approximately 4 inches and the radially outwardmost edge of the blade 50 is preferably located approximately 16 inches from the longitudinal/vertical axis of the drive shaft 48 and swings in an arc of approximately 68° when the cylinder rod 72 moves throughout its full stroke up to 1½ inches past the vertical chuck axis. Moreover, the amount of the rotation provided to slicer assembly 14 as well as the positioning of the radially outwardmost edges of the blade 60 relative to the vertical axis of the rotator sleeve 64 is in an amount sufficient so that a portion of the blade 60 may contact the outer circumference of the bone during rotation of the meat wherein this circumference is radially outwardmost from the rotator sleeve axis 64.

To summarize the operation of the present invention, meat is disposed between chucks 28 and 40 and held by the plurality of spikes located thereon. The meat is then rotated about the chuck assembly axis by means of electrical motor 16 which is in turn controlled by motor controller 152. The slicer assembly 14 and slicer blade 60 are caused to index in a vertical fashion upon energization of motor 96 which in turn drives shaft 66 through sprockets 98, 100 and drive chain 102. The slicer blade is brought into engagement with the meat by energization of pneumatic cylinder 70 through line 142 causing cylinder rod 72 to linearly index and apply torque to blade rotator shaft 64 by means of blade rotator arm 220 and pin 74. The rotation of meat in chuck assembly 11 and the linear indexing of the slicer assembly 14, thereby effect a spiral cut on the meat disposed in the chuck assembly 11. The engagement force provided by means of pneumatic cylinder 70 may be overcome readily by means of a handle connected to blade support arm 58. Upon de-energization of the slicer assembly 1 will maintain its relative vertical position prior to de-energization. Slicing operations may be recommenced with the slicer assembly 1 maintaining the same position and reengaging the meat to maintain the same spiral cut. Boneless slicing operations are carried out in the like manner with the following exceptions. A meat spit is inserted in the meat to be cut and fitted into upper and lower chucks 40 and 28. The meat is then positioned between chucks 28 and 40 with the tee member 402 of spit 400 positioned in slot 300 and the stem member 404, in blind hole 312. A split nut 242 is fitted over cylinder rod 72 and threaded onto externally threaded nut 240 which is on the fact of the cylinder housing 70, thereby limiting the movement of cylinder rod 72 to prevent slicer blade 60 from coming into engagement with meat spit 400.

It is therefore apparent that the present invention is adapted to obtain all of the advantages and features hereinabove set forth. It will be understood that certain combinations and subcombinations are futility and may be employed without reference to other features and subcombinations. Moreover the foregoing disclosure and description of the invention are illustrative and explanatory thereof are not designed to be limiting as to the scope of the present invention.

I claim:

1. An apparatus for spirally slicing meat, comprising:

(a) a meat holding means adapted to hold a ham or other cut of meat to be sliced, said holding means being adapted for rotating said meat, thereby defining a first rotational axis;

(b) a rotary means for rotating said meat holding means about said first rotational axis, said rotary means having a variable rotational rate and being capable of rotating in either a clockwise or counter-clockwise direction;

(c) a rotary slicing means for slicing said meat when in cutting engagement therewith;

(d) an electro-mechanical linear indexing means, interconnected to said rotary slicing means, for moving said rotary slicing means along a path substantially parallel to said first rotational axis, thereby defining a linear indexing axis, said linear indexing means being capable of rotation about said linear indexing axis, thereby pivoting said rotary slicing means selectively toward or away from said first rotational axis, the rate of movement of said linear indexing means being variable and independent of the rotational rate of said rotary means, thereby effecting a continuous spiral slice of selectable thickness through said meat when said rotary means is rotating said meat holder and said linear indexing means rotates to bring said rotary slicing means in cutting engagement with said meat, the independent variability of movement of said rotary means and said linear indexing means being such that a wide range slice thickness may be attained, while maintaining uniform slicing quality over range of different meats having different consistencies;

(e) a variable, pneumatic lateral indexing means, interconnected to said linear indexing means, for selectively rotating said linear indexing means, thereby pivoting said rotary slicing means into and out of cutting engagement with said meat, said lateral indexing means being independent of said linear indexing means and said rotary means, said lateral indexing means being designed such that rotational force exerted by said lateral indexing means upon said linear indexing means and thereby said rotary slicing means is selectively variable and uniform throughout the movement of said lateral indexing means, said rotational force exerted by said lateral indexing means being sufficient to bring said rotary slicing means into cutting engagement with said meat and readily permit said rotary slicing means to move reciprocally into and away from said first rotational axis in response to the position of bones within said meat, while maintaining cutting engagement with said meat, thereby decreasing meat spoilage due to bone chipping during slicing operations and facilitating the slicing operations by decreasing the amount of operator intervention necessary to overcome said rotational force exerted by said pneumatic lateral indexing means, thereby preventing chipping of bones within said meat and ensuring uniform slicing quality throughout the slicing process.

2. The slicing apparatus of claim 1, wherein said meat holder comprises an adjustable chuck assembly, having an upper and lower opposed chucks, each chuck being journaled for rotation and co-axially aligned with said first rotational axis, said opposing chucks each having a plurality of spikes for holding and retaining meat disposed within said chuck assembly.

3. The apparatus of claim 2, wherein said rotary slicing means comprises:

(a) a rotary slicer assembly housing interconnected to said linear indexing means, thereby permitting said housing to pivot about said linear indexing axis with the rotational movement of said linear indexing means;

(b) a slicer motor, mounted within said slicer assembly housing;

(c) a blade support arm, having first and second ends, said first end being interconnected to said rotary slicer assembly housing, said blade support arm being disposed in a plane substantially perpendicular to said linear indexing axis;

(d) a rotating slicer blade, having a peripheral cutting edge, pendently mounted on said second end of said blade support arm and journaled for rotation; and (e) a transmission means for transmitting torque from said slicer motor to said slicer blade.

4. The apparatus of claim 2, wherein said linear indexing means comprising:

(a) an electric motor;

(b) an electric motor controller means for controlling rotational speed and direction of said electric motor;

(c) an externally threaded drive shaft, having a longitudinal axis, said drive shaft longitudinal axis being co-axial with said linear indexing axis, said threaded drive shaft being journaled for rotational movement about said linear indexing axis;

(d) a rotator sleeve, said rotator sleeve having a longitudinal axis, said sleeve longitudinal axis being co-axial with said linear indexing axis, said rotator sleeve having internal threads and being in threaded engagement with said threaded drive shaft, said rotator sleeve being interconnected to said rotary slicing means and said pneumatic lateral indexing means, said pneumatic lateral indexing means restricting rotational movement of said rotator sleeve about said linear indexing axis; and (e) a transmission means for transmitting rotational movement of said motor to said threaded drive shaft, said rotational movement of said drive shaft thereby causing said rotator sleeve, being in threaded engagement with said threaded drive shaft and restricted in rotational movement, to move linearly along said linear indexing axis, thereby causing the linear movement of said rotary slicing means along said linear indexing axis.

5. The apparatus of claim 2, wherein said pneumatic indexing means comprises:

(a) a pneumatic cylinder housing, having a first and a second end, said housing being disposed in a plane generally perpendicular to said linear indexing axis;

(b) a pneumatic pressure source;

(c) a piston disposed within said pneumatic cylinder housing between said first and seconds ends and moveable within said housing in response to pneumatic pressure;

(d) a cylinder rod, having a longitudinal axis and a first and second end, said first end of rod being connected to said piston and passing through said second end of said pneumatic cylinder housing;

(e) means for connecting said pressure source to said cylinder housing, said means being designed to selectively supply pneumatic pressure to said first or second end of said housing, thereby moving said piston and said cylinder rod toward said second or said first end of said housing, respectively; and (f) pivoting means, said pivoting means having a first and second end, said first end of said pivoting means being pivotally connected to said second end of said cylinder rod, said second end of said pivoting means being connected to said rotator sleeve of said linear indexing means, wherein rotational movement and force exerted by said lateral indexing means upon said linear indexing means is controlled by movement and force exerted by said piston and cylinder rod in response to selective application and magnitude of said pneumatic pressure source to said housing.

6. The apparatus of claim 3, wherein said lateral indexing means further includes:

(a) an externally threaded nut affixed to said second end of said pneumatic cylinder housing, said nut being coaxially aligned with the longitudinal axis of said cylinder rod thereby permitting the movement of said rod through said nut; and (b) a split nut stop, said stop being selectively fitted over said cylinder rod, said stop having internal threads and being threadedly engaged with said externally threaded nut, said movement of said cylinder rod and piston toward said first end of pneumatic cylinder housing in response to pneumatic pressure being limited when said first end of said pivotal means, being connected to said second end of said cylinder road, comes into contact with said stop nut, thereby limiting rotation of said rotator sleeve of said linear indexing means and pivotal movement of said rotary slicing means toward said first rotational axis.

7. The apparatus of claim 6, further including:

(a) a meat spit, having a longitudinal axis, to be inserted in a boneless cut of meat to be sliced; and (b) means for mounting said meat spit within said rotating opposed chucks, said longitudinal axis of said meat spit being substantially co-axial with said first rotational axis, thereby permitting spiral slicing of boneless meats when a cut of meat with said spit is placed within said chuck assembly and said stop on pneumatic lateral indexing limiting pivotal movement of said rotary slicing means toward said first rotational axis, thereby preventing said rotary slicing means from coming into contact with said meat spit.

8. The apparatus of claim 5, wherein said means for connecting said pressure source to said pneumatic cylinder housing comprises:

(a) a first supply line for delivering pneumatic pressure from said pressure source to said first side of said cylinder housing;

(b) a second supply line for delivering pneumatic pressure to said second side of said cylinder housing;

(c) means for selectively varying and regulating the pneumatic pressure supplied to said cylinder housing;

(d) means for selectively delivering pneumatic pressure through either said first or said second supply line to said cylinder housing.

* * * * *